(12) United States Patent
Kwong

(10) Patent No.: US 7,587,177 B1
(45) Date of Patent: Sep. 8, 2009

(54) ELECTRONICALLY CONFIGURABLE TRANSMIT AND RECEIVE PATHS FOR FDD WIRELESS COMMUNICATION DEVICES

(75) Inventor: Kelvin H. Kwong, Saratoga, CA (US)

(73) Assignee: Exalt, Inc., Campbell, CA (US)

( * ) Notice: Subject to any disclaimer, the term of this patent is extended or adjusted under 35 U.S.C. 154(b) by 700 days.

(21) Appl. No.: 11/301,810

(22) Filed: Dec. 12, 2005

(51) Int. Cl.
*H04B 1/44* (2006.01)
(52) U.S. Cl. .............. 455/78; 455/552.1; 455/553.1; 455/82; 455/101; 455/115.1; 455/132; 455/140; 455/575.9; 455/129; 455/269; 343/702; 343/700
(58) Field of Classification Search ............. 455/552.1, 455/553.1, 82, 78, 575.7, 101, 115.1, 132, 455/140, 575.9, 129, 269; 343/702, 700
See application file for complete search history.

(56) References Cited

U.S. PATENT DOCUMENTS

| | | | |
|---|---|---|---|
| 7,239,889 B2 * | 7/2007 | Saari et al. | 455/552.1 |
| 7,248,839 B2 * | 7/2007 | Luy et al. | 455/82 |
| 2003/0124982 A1 * | 7/2003 | Saari et al. | 455/67.4 |
| 2007/0018895 A1 * | 1/2007 | Bolin | 343/702 |

* cited by examiner

*Primary Examiner*—Matthew D Anderson
*Assistant Examiner*—April S Guzman
(74) *Attorney, Agent, or Firm*—Hickman Palermo Truong & Becker LLP; Christian A. Nicholes

(57) ABSTRACT

Methods and systems are provided for allowing an FDD radio to be configured to operate in Rx-high/Tx-low or Rx-low/Tx-high modes of operation. In accordance with one aspect, this is achieved in an FDD radio configuration that includes multiple switches, multiple Rx electronics, and multiple Tx electronics, allowing a diplexing filter to have selectively coupled to its high and low terminals desired Tx or Rx paths, such as to allow the radio to operate in one or another mode.

14 Claims, 4 Drawing Sheets

ELECTRONICALLY CONFIGURABLE TRANSMIT AND RECEIVE PATHS FOR FDD WIRELESS COMMUNICATION DEVICES

FIELD OF THE INVENTION

The present invention relates to wireless communications, including wireless radios, and in particular, to systems and methods for providing electronically configurable transmit and receive paths in such systems.

BACKGROUND OF THE INVENTION

In frequency division duplex or FDD radios, transmitter and receiver carrier waves operate simultaneously on different frequencies. FIGS. 1A and 1B illustrate this concept.

FIG. 1A is a block diagram of a pair of FDD radios or an "A, B hop" of an FDD link, in accordance with the prior art. Such radios could be any time of point-to-point or point-to-multipoint radios which may employ FDD for communication signals. As shown, a first radio 102 transmits signals to a second radio 104 using a first frequency range A (the "low"), which frequency range is used by the second radio 104 for receiving signals. In turn, the second radio 104 transmits signals to the first radio 102 using a second frequency range B (the "high"), which frequency range is used by the first radio 102 for receiving signals.

FIG. 1B graphically depicts the transmit (Tx) and receive (Rx) frequency bands A and B for the FDD radios 102 and 104 shown in FIG. 1A.

Because the transmitter and receiver carriers operate on difference frequencies in FDD radios, each terminal in a two radio link (such as that shown in FIG. 1A) is not identical. As such, an FDD radio will typically include a diplexing filter or diplexer at an antenna port to provide isolation between the receiver and transmitter paths and transmitter and receiver selectivity.

FIG. 1C depicts a conventional FDD digital radio configuration. As shown, a modem 110 provides I (in-phase) and Q (quadrature) signals at base band to a mixer 112 in a transmit (Tx) path 130. The mixer 112, which is usually coupled to a local oscillator (not shown) modulates the base band signals to a intermediate frequency or some other frequency approaching or at the transmission carrier frequency for the radio. A set of one or more amplifiers, depicted as amplifiers 114 and 116, boost the signal and provide the amplified signal to a diplexer 118 for transmission via an antenna(e).

The diplexer 118 isolates these transmitted signals from a receive (Rx) path 132, and similarly, isolates signals received by the radio from the Tx path 130 as they are provided to the Rx path 132. The Rx path 132 includes one or more amplifiers (or attenuators) 120 and 124 to amplify the received signal(s). The amplified signal(s) are provided to a mixer 126 for (down) converting into I and Q components at baseband, which are then provided to the modem 110 for further processing.

In the radio configuration shown in FIG. 1C is typically made by a manual connection of the receive and transmit paths to the desired terminals 134 and 136, respectively, of the diplexer 118—depending on whether Tx or Rx should be on the "high" or "low" range of the FDD link for a particular radio (i.e., whether the radio should be configured as an A or B). For example, applying the configuration shown in FIG. 1C to the A, B hop shown in FIG. 1A, assuming terminal 134 is for Tx "low" and terminal 136 is Rx "High", then if radio 102 of the FDD radio pair shown therein has its Tx path coupled to the terminal 134 and its Rx path coupled to the terminal 136 of the diplexer 118 (and assuming both radios have similar configurations and using the same type of diplexer having the same ports), then the configuration of radio 104 will be reversed such that its Tx path will be coupled to terminal 136 ("high") and its Rx path will be coupled to terminal 134 ("low"). A pair of radios configured such are typically referred to as a "hop" having "A" and "B" terminals (or radios).

A hop is typically configured by a manufacturer. As such, in a number of applications of hops (e.g., high capacity/speed point-to-point microwave FDD digital radios), end users or customers will typically purchase hop pairings—that is, for every "A" radio, a "B" configured radio will be purchased/used.

Situations may arise, however, in which a user may need an A radio to function as a B radio. For example, a B radio may become non-functional and a spare A radio may be available for swapping. In such situations, typically a manual switching of the diplexer configuration may need to be performed. Unfortunately, manually switching the diplexer configuration may be undesirable since it may be beyond the capabilities of the user and may expose sensitive electronics within a radio's housing to damage.

Another method sometimes used to switch the radio configuration is to place a diversity (or transfer) switch at the terminals of the diplexer, allowing the Tx and Rx paths and the "high" and "low" ports of the diplexer to be reversed. However, such switches generally are mechanical and thus can be relatively expensive, driving up the cost of the radio. Transfer switches may also be relatively difficult to implement because the Tx and Rx paths must be isolated (at the switch) to prevent interference of signals/energy between the Tx and Rx signals at the switch, thus requiring duplication of some of the functionality of the diplexer and additional complexity and cost to reduce the effects of Tx and Rx energy at or near the switch.

Thus, what is needed is an improved system and method for selecting or switching diplexed paths of an FDD radio.

SUMMARY

Methods and systems are provided for allowing an FDD radio to be configured to operate in Rx-high/Tx-low or Rx-low/Tx-high modes of operation. In accordance with one aspect, this is achieved in an FDD radio configuration that includes multiple switches, multiple Rx electronics, and multiple Tx electronics, allowing a diplexing filter to have selectively coupled to its high and low terminals desired Tx or Rx paths, such as to allow the radio to operate in one or another mode.

Other aspects of the invention will become apparent from the detailed description of exemplary embodiments that follows.

BRIEF DESCRIPTION OF THE FIGURES

The present invention is illustrated by way of example and not limitation in the Figures of the accompanying drawings in which.

DESCRIPTION OF THE EMBODIMENTS

The present invention provides methods and systems for configuring an FDD radio to operate as an "A" or "B" type radio—i.e., transmitting or receiving in either the FDD high or low modes. In accordance with one aspect of the invention, multiple receive and multiple transmit electronics are selectively switched using multiple electronic switches that allow various paths to be selected and coupled to the modulator and demodulator paths of a modem (and/or other radio subsystem) and also selectively coupled to a diplexing filter such that the radio may be relatively easily configured to transmit or receive high or low.

It should be appreciated by those skilled in the art that each of the circuits, functional units, flow diagram blocks or other modules described with reference to the Figures may be implemented in hardware (e.g., FPGA, ASIC, other integrated circuits, general purpose and/or specialized processors, etc.), software or firmware, or a combination thereof without departing from the spirit or scope of the invention.

Exemplary System Architecture

Figure 2:
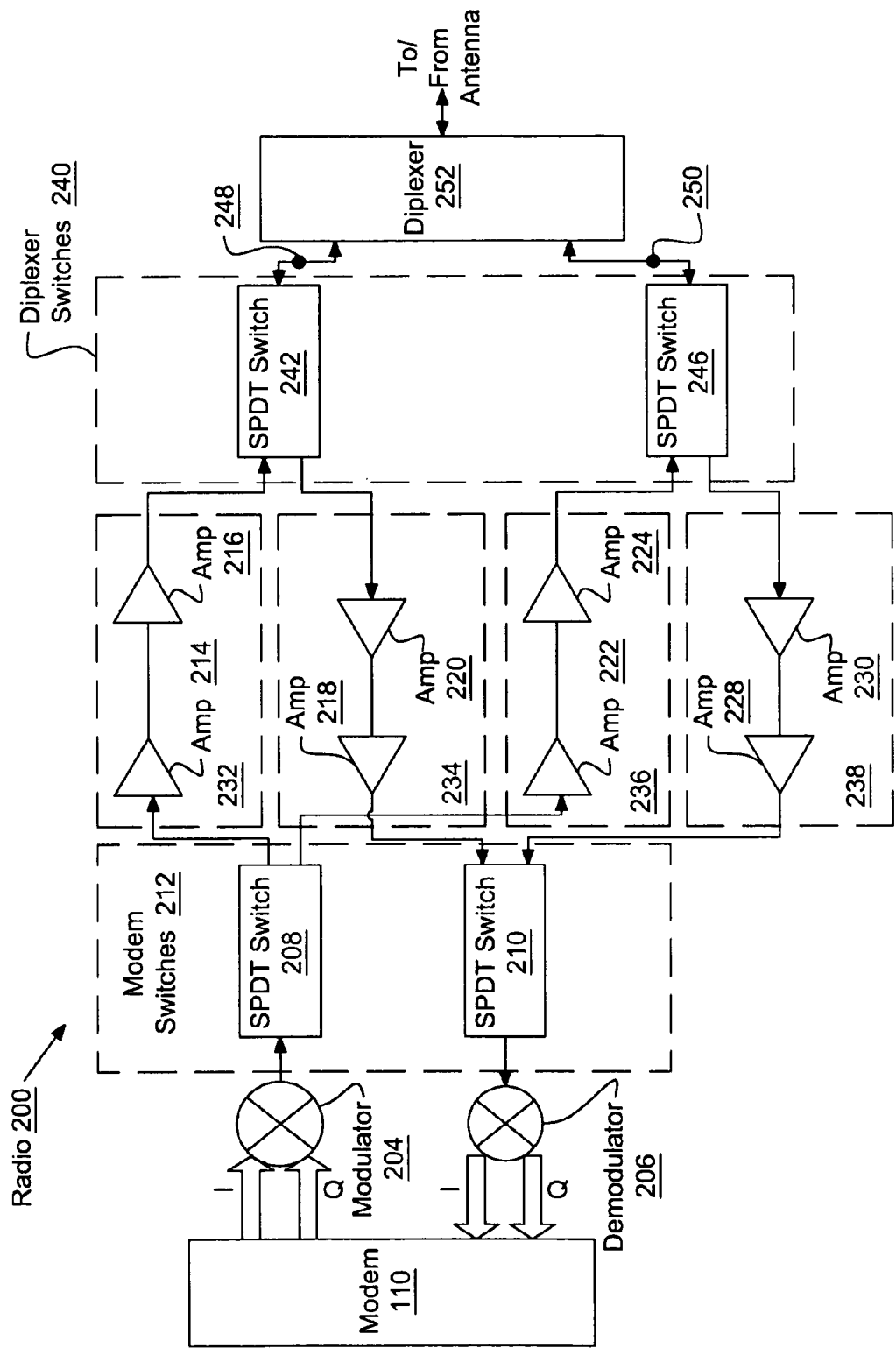
FIG. 2 is a block diagram illustrating an exemplary FDD radio employing multiple Tx and Rx circuits (or paths) and multiple electronic switches to allow configuring the radio to operate as an A or B FDD radio, in accordance with one embodiment of the invention.

FIG. 2 is a block diagram illustrating an exemplary FDD radio employing multiple Tx and Rx circuits (or paths) and multiple electronic switches to allow configuring the radio to operate as an A or B FDD radio, in accordance with one embodiment of the invention.

The FDD radio 200 in one embodiment of the invention represents a high capacity FDD microwave radio that may be used to interconnect mobile base stations, access points, and enterprise networks across wide geographic areas and/or core backbone networks. Such a radio may be configured, in one embodiment, to operate in one or more of various frequencies including without limitation 2.4 Gigahertz (GHz), 5.8 GHz, and/or 11 GHz. It should be appreciated to those skilled in the art, however, that the invention may be employed in any number of FDD applications and systems, which may employ other frequencies, be used for voice and/or data, etc.

The radio 200 includes a modem 202, having a Tx portion for providing I and Q signals, generally at baseband frequencies, to a modulator (or mixer) 204 to be modulated for transmission, and an Rx portion for receiving demodulated I and Q signals from a demodulator 206, again typically at baseband frequencies.

The modulator 204 modulates (or "upconverts") baseband I and Q signals and provides the up-converted signal to a single pole, double throw (SPDT) switch 208. Typically, a local oscillator (LO) (not shown), operating at a desired frequency, will be coupled to the modulator 204 for mix with the I and Q signals for up-conversion to a desired intermediate frequency (IF) or RF frequency.

The switch 208, in turn, selectively couples the input modulated signal to a transmit path 232 (which includes amplifiers 214 and 216, and may include other electronics not shown) or to a transmit path 236 (which includes amplifiers 222 and 224).

The transmit path 232 is selectively coupled to switch 242, which in turn is coupled to a first "low" terminal 248 of a diplexer 252. On the other hand, the transmit path 236 is selectively coupled to a switch 246, which in turn is coupled to a second "high" terminal 250 of the diplexer 252.

As can be appreciated by those skilled in the art from the Tx-side configuration of the radio 200 described thus far, the radio 200 may be configured, based on the position of the switches 208, 242 and 246 and use of two Tx paths 232 and 236, to selectively allow Tx-high (via terminal 250 of the diplexer 252) or Tx-low (via low terminal 248 of the diplexer 252) modes.

Similarly, the radio 200 may be configured to allow Rx-high or Rx-low modes of operation to be electronically selected, as will now be described in further detail, as would be appropriate (for the particular Tx/Rx mode desired).

The demodulator 206 is coupled to a switch 210, which in turn is shown selectively coupled to a receive path 234 or a receive path 238.

The receive path 234, in turn, is selectively coupled to the switch 242, while the receive path 238 is coupled to the switch 246.

As thus described, the switch 210 may be configured either to receive via signals passed by the low terminal 248 or the high terminal 250 of diplexer 252.

In one embodiment, the switches 208 and 210 (which together are shown as a set of modem switches 212) may be selected to be relatively lower frequency switches than the set of diplexer switches 240, which includes switches 242 and 246.

As can be appreciated from the configuration of the radio 200, depending on the "switch position" of the switches 208, 210, 242 and 246, either Tx path 232 (Tx low) along with Rx path 238 (Rx high) or Tx path 236 (Tx high) along with Rx path 234 (Rx low) will be selected, allowing the radio 200 to operate as either an A or B terminal of an FDD hop.

The radio 200 has a number of benefits. One benefit of the configuration shown in FIG. 2 is that in either mode of operation (Rx-high/Tx-low or Rx-low/Tx-high), the Tx and Rx paths being used can be physically and/or electronically separated from each other to prevent undesired interference. Also, because the electronics for the multiple Tx or Rx paths is relatively inexpensive, such a configuration may provide significant cost savings relative to mechanical switch implementations of prior art techniques. Moreover, radios configured in accordance with the embodiment shown in FIG. 2 may be manufactured as a single type, not requiring factory configuration and stocking, allowing end-users to configure terminals of a hop relatively easily for replacement/swapping, to better cope with local environmental conditions (where one mode for a particular radio(s) may be determined, often after installation/alignment of the radios, to be preferable over another).

Various mechanisms may be implemented to allow relatively easy selection/configuration of radio hop bands for Rx/Tx high/low modes. For example, a graphical user interface (GUI) may be provided for the radio, allowing a user to easily to select a particular mode. Such selection may cause software (embodied in a machine-readable medium within the radio) to be executed to cause the switches to shown in FIG. 2 to be configured accordingly. Other interfaces (e.g., mechanical switches, for example, easily accessible to a user) may be used to cause electronic/software configuration of the switches, and in turn, the mode of operation of the radio.

In one embodiment, intelligent software algorithms may be provided to allow automatic configuration of the radio to operate in one or another Tx and Rx high or low band mode. For example, once a pair of radios are installed and properly aligned, a radio may "listen" to the other radio to determine which mode it is operating in, and then set itself to the other mode (e.g., if the terminal of interest listens to the other terminal and determines that the other terminal is operating in Tx-low/Rx-high, it will configure its mod/demod switches 212 and diplexer switches 240 so that it operates in Tx-high/Rx-low mode). Alternatively, one radio may instruct another radio to operate in A or B mode (e.g., using a control channel, control data, etc., which may be transmitted in or out of the FDD bands as part of or separate from other types of transmissions, e.g., data, handshaking/initialization, etc.).

In one embodiment, paths 232 and 234, along with switch 242, may be implemented by a single integrated circuit, such as an ASIC, while similarly, paths 236 and 238, along with switch 246 may be implemented by another single integrated circuit. Such an implementation may provide cost and size savings, and also provide isolation/reduce interference by separating the two sets of paths from each other.

Similarly, switch 208 may be implemented as a single integrated circuit, while the switch 210 may be implemented as another single integrated circuit.

In another embodiment, However, depending on design choices, in other embodiments, other types of integration or separation of the blocks shown in FIG. 2 are possible, and will be appreciated to those skilled in the art from the foregoing description.

In one embodiment, a mechanical relay or MEMS type switch, such as M1C06-CDK2 sold by Dow Key Microwave of Ventura, Calif., may be employed for one or more of the switches shown in FIG. 2. In one embodiment, these types of switches are used on the diplexer side (as diplexer switches 242 and 246).

In another embodiment, solid state switches, such as UPG2022T5G, available from NEC, may be used to implement switches 242, 246 and/or switches 208 and 210.

Moreover, depending on the mode in which the radio is operating in, the unused paths (e.g., two of 232, 234, 236 and 238 that are unused) of that mode may be disabled/powered-down to reduce power consumption.

Thus, a system and method for allowing an FDD radio to be configured to operate as an A or B terminal of a hop has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

Figure 1A:
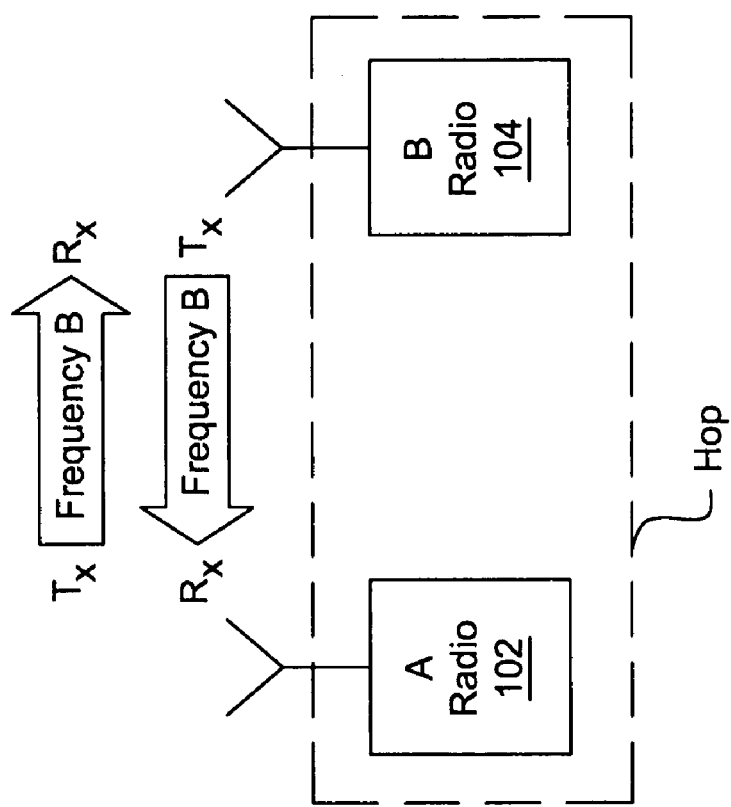
FIG. 1A is a block diagram of a pair of FDD radios or an "A, B hop" of an FDD link, in accordance with the prior art.
Figure 1B:
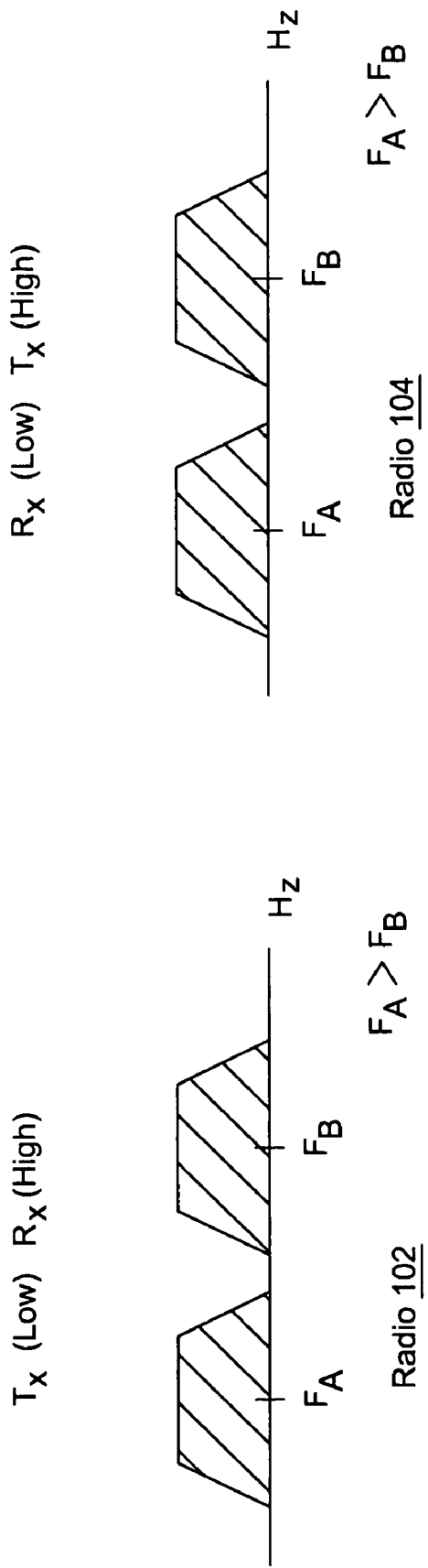
FIG. 1B graphically depicts the transmit (Tx) and receive (Rx) frequency bands A and B for the FDD radios 102 and 104 shown in FIG. 1A.
Figure 1C:
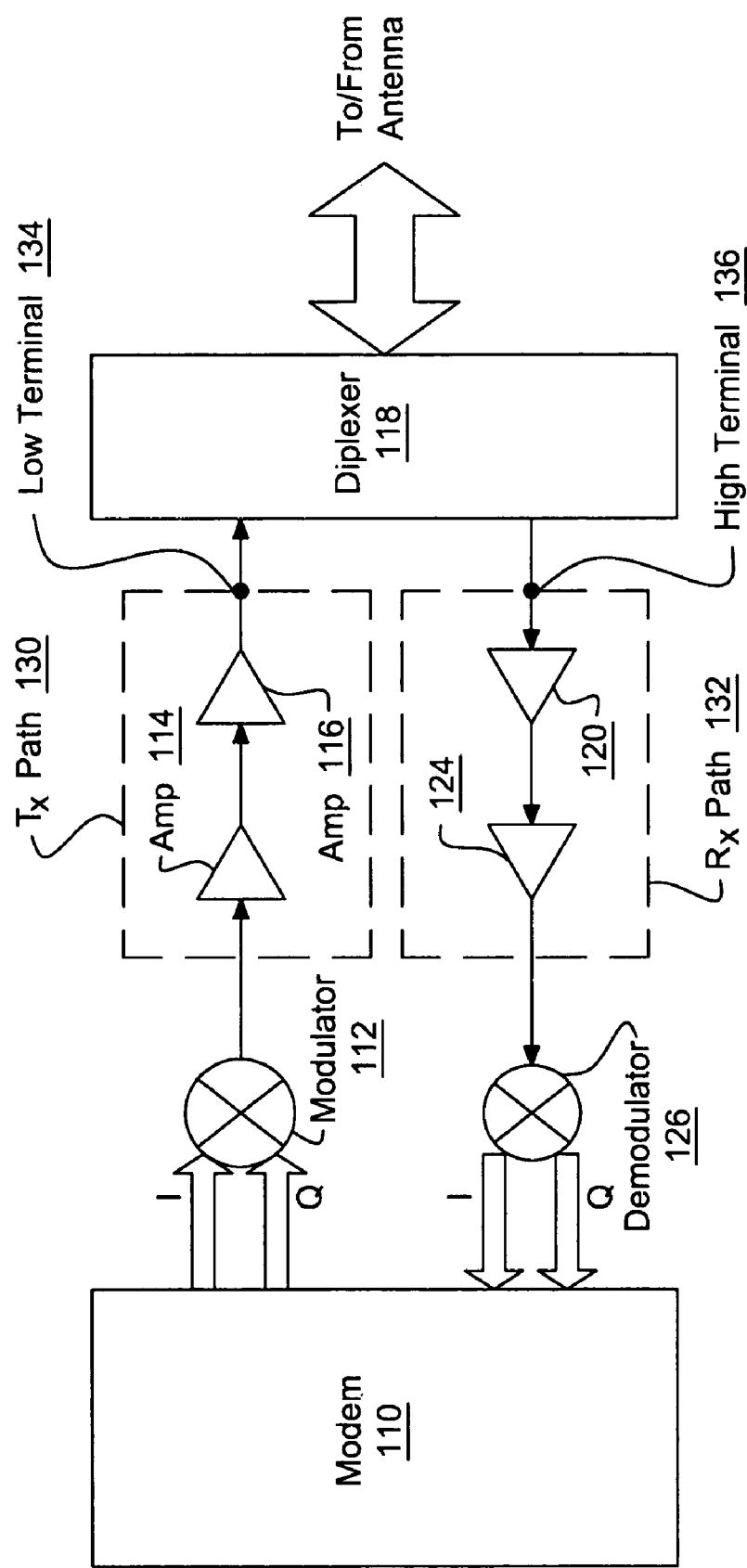
FIG. 1C depicts a conventional FDD digital radio configuration, in accordance with the prior art.

In this description, numerous specific details are set forth. For example, in the various receive and transmit paths show in FIG. 1C and FIG. 2, additional or fewer amplifiers and mixers may be used for converting signals to various intermediate frequencies (IF), various filters may be used to "clean up" signals, etc.

However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" or "some embodiments" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Moreover, in this description, the phrase "exemplary embodiment" means that the embodiment being referred to serves as an example or illustration.

Herein, block diagrams illustrate exemplary embodiments of the invention. Also herein, flow diagrams illustrate operations of the exemplary embodiments of the invention. The operations of the flow diagrams are described with reference to the exemplary embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Moreover, it should be understood that although the flow diagrams depict serial operations, certain embodiments could perform certain of those operations in parallel.

Each of the claims that follow represent one embodiment of the invention, and as such, each claim on its own is hereby incorporated by reference into this detailed description as a separate, independent embodiment of the invention.

What is claimed is:

1. An apparatus comprising:
   a diplexer, having a high terminal and a low terminal;
   a high receive path;
   a high transmit path;
   a low receive path;
   a low transmit path;
   a first diplexer switch, coupled to the high terminal of the diplexer and further coupled to the high receive path and the high transmit path, the first diplexer switch to selectively couple either the high receive path or the high transmit path to the high terminal of the diplexer;
   a second diplexer switch, coupled to the low terminal of the diplexer and further coupled to the low receive path and the low transmit path, the second diplexer switch to selectively couple either the low receive path or the low transmit path to the low terminal of the diplexer;
   a modem having a receive port and a transmit port;
   a transmit switch, coupled to the transmit port of the modem and further coupled the high transmit path and the low transmit path, the transmit switch to selectively couple either the high transmit path or the low transmit path to the transmit port of the modem; and
   a receive switch, coupled to the receive port of the modem and further coupled to the high receive path and the low receive path, the receive switch to selectively couple either the high receive path or the low receive path to the receive port of the modem.

2. The apparatus of claim 1, wherein the receive and transmit switches are configured to operate at lower frequencies relative to the first and second diplexer switches.

3. The apparatus of claim 1, wherein the receive and transmit switches are configured to operate at intermediate frequency (IF) and the first and second diplexer switches are configured to operate at carrier frequency (RF).

4. The apparatus of claim 3, wherein the RF frequency is one of 2.4 Gflz, 5.8 GI-lz and 11 Gflz.

5. The apparatus of claim 1, further comprising a modulator having an input coupled to the transmit port of the modem and an output coupled to the transmit switch.

6. The apparatus of claim 5, further comprising a demodulator having an output coupled to the receive port of the modem and an input coupled to the receive switch.

7. A wireless communication device that allows full duplex communication comprising:
   a diplexing filter comprising high and low terminals;
   a first transmit path;

a second transmit path;
a first receive path;
a second receive path;
a plurality of switches, controlled by software, to selectively couple one of the first and second receive paths to the high or low terminal of the diplexing filter and to selectively couple one of the first and second transmit paths to the other terminal of the diplexing filter, thereby allowing the device to operate in a first mode for allowing Tx-high and Rx-low or in a second mode for allowing Tx-low and Rx-high; and
processing circuitry that: (1) determines whether wireless communications received at the wireless communication device from another device are in (a) Tx-low/Rx-high mode or (b) Tx-high/Rx-low mode, (2) automatically sets the plurality of switches to a first configuration that causes the wireless communication device to be in Tx-low/Rx-high mode in response to determining that the received communications are in Tx-high/Rx-low mode, and (3) automatically sets the plurality of switches to a second configuration that causes the wireless communication device to be in Tx-low/Rx-high mode in response to determining that the received communications are in Tx-high/Rx-low mode.

8. The device of claim 7, wherein at least one of the plurality of switches comprises an electronic single pole, double throw (SPDT) switch.

9. The device of claim 8, wherein the plurality of switches includes a set of four SPDT switches.

10. The device of claim 9, wherein at least one of the set of SPDT switches operates at a different frequency relative to at least another one of the set of SPDT switches.

11. The device of claim 10, further comprising a graphical user interface (GUI) for allowing a user to select one of the first and second modes.

12. The device of claim 10, further comprising a mechanical switch for allowing selection of the first and second modes.

13. A method comprising:
receiving, at a first radio device that is in Tx-low/Rx-high mode, transmissions from a second radio device that also is in Tx-low/Rx-high mode;
determining, in response to the receiving, that the second radio device is also in Tx-low/Rx-high mode;
in response to determining that the second radio device is also in Tx-low/Rx-high mode, automatically modifying a set of switches to change configurable paths within the first radio device;
wherein automatically modifying the set of switches to change configurable paths within the first radio device causes the first radio device to leave Tx-low/Rx-high mode and enter Tx-high/Rx-low mode instead.

14. The method of claim 13, wherein the determining and the modifying steps are performed by processing circuitry within the first radio device rather than by a human being.

* * * * *